2,951,103
PERCHLOROETHYLENE PRODUCTION

Arthur C. Ellsworth, Pittsburgh, Pa., and Raymond M. Vancamp, New Martinsville, W. Va., assignors to Columbia-Southern Chemical Corporation, Allegheny, Pa., a corporation of Delaware No Drawing. Filed Sept. 4, 1958, Ser. No. 758,896

7 Claims. (Cl. 260—654)

The present invention relates to the production of unsaturated chlorinated hydrocarbons. More particularly, the present invention relates to the catalytic reaction of symmetrical tetrachloroethane to produce perchloroethylene.

The reaction of symmetrical tetrachloroethane and oxygen at elevated temperatures in the presence of a catalyst is well known in the art and may be conveniently illustrated by the following formula:

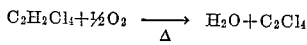

During this reaction, apparently due to cracking of the symmetrical tetrachloroethane feed, considerable quantities of trichloroethylene are also produced. Both perchloroethylene and trichloroethylene are valuable solvents, being widely used in the dry cleaning industry, vapor phase degreasing operations and other similar applications. Production of trichloroethylene and perchloroethylene during the catalytic oxidation hereinabove described provides a convenient method of obtaining both these valuable solvents.

However, during the catalytic oxidation of symmetrical tetrachloroethane hereinabove referred to, other side reactions occur which produce considerable quantities of contaminating impurities in the perchloroethylene-trichloroethylene product streams. These impurities are mainly dichloroethylene both cis and trans, 1,2-dichloroethane, hexachloroethane and pentachloroethane. Hexachloroethane and pentachloroethane in particular are formed rapidly during this process and in substantial quantities. The formation of substantial quantities of these compounds has a deleterious affect on the yields of desirable products thereby rendering the oxidation process unattractive. In addition to reducing yields of desirable solvents substantial production of hexachloroethane and pentachloroethane introduces serious separation and recovery problems rendering the recovery and separation of products cumbersome and difficult. In an attempt to improve yields of desirables, hexachloroethane and pentachloroethane may be recycled to the oxidation zone in an attempt to crack them to product. Rapid buildup of these two undesirables in recycle streams however, quite frequently renders such operations impractical.

In accordance with this invention, many of the difficulties normally encountered in the production of perchloroethylene by the catalytic reaction of oxygen and symmetrical tetrachloroethane may now be minimized or completely obviated. Thus, the production of higher chlorinated hydrocarbons such as pentachloroethane and hexachloroethane is minimized over prolonged periods of operation and in most cases completely obviated during shorter periods of operation, thus simplifying recycle problems and separation and recovery operations. Yields of perchloroethylene produced by the oxidation reaction and of trichloroethylene produced concurrently are increased substantially.

According to the present invention it has been found that by regulating the ratio in which oxygen and symmetrical tetrachloroethane are used to produce perchloroethylene the advantages hereinabove mentioned are obtained. Thus, by limiting the oxygen supply in a reaction system producing perchloroethylene by the catalytic oxidation of symmetrical tetrachloroethane at elevated temperature to between 15 percent and 75 percent of the theoretical oxygen requirement for the symmetrical tetrachloroethane feed material employed, it is found that hexachloroethane formation in the product stream is minimized or completely avoided. Pentachloroethane formation is also minimized or controlled within tolerable limits. Productivity, that is, the production of trichloroethylene and perchloroethylene products, is maintained at a high level for a substantial period of time despite this reduced oxygen feed.

Theoretical oxygen as used herein refers to that quantity of oxygen which stoichiometrically would be necessary to react with symmetrical tetrachloroethane to produce water and perchloroethylene according to the formula hereinabove given. When the feed material is essentially symmetrical tetrachloroethane, the theoretical oxygen requirement would be that quantity of oxygen required to react with the oxidizable hydrogens contained in the symmetrical tetrachloroethane feed to produce a molecule of water. When a mixture of chlorinated hydrocarbons constitutes the hydrocarbon feed, the oxygen requirement is based upon the stoichiometric amount of oxygen required to oxidize the hydrogen contained in each of the constituents of the chlorinated hydrocarbon feed. Mixed chlorinated hydrocarbon feeds are utilized when recycle is employed in a tetrachloroethane-oxygen catalytic reaction.

The catalyst utilized in accordance with this invention is in the form of a particulate composition composed of a carrier material containing thereon metal chlorides such as zinc, copper, magnesium, iron and the like and mixtures thereof. Many materials may be employed as carriers for the metal chloride catalyst utilized. Thus, materials such as alumina, alumina gels, silica, silica gels, calcium silicate, diatomaceous earth, infusorial earth, pumice, and kieselguhr, and other like materials may be conveniently employed. A particularly effective carrier is a calcined diatomaceous earth sold by the Johns-Manville Corporation under the trade name Celite.

The configuration of the carrier particles employed is susceptible to wide variation and they may be spherical, cylindrical or irregular in shape. Celite pellets employed in the preferred embodiments of this invention are generally cylindrical in shape, the particles being extruded in manufacture to conform to a uniform diameter and cut in various lengths as desired.

The catalytic chloride salts supported or otherwise contained in the carrier particles may be placed therein utilizing any well known method. Thus, carrier particles immersed in a solution containing the catalytic chloride salts may be one method of placing the catalyst material on the carrier. If desired, solutions containing the active chlorides may be sprayed on catalyst particles and then dried. In fact, any method which will effectively deposit upon the carrier used the required quantities of metal chloride salts may be employed.

A particularly suitable catalyst composition utilized in the herein described process is prepared by impregnating or coating or otherwise placing on a carrier particle a mixture of zinc and copper chlorides in amounts ranging from at least 5 percent up to 45 percent by weight of the catalyst particle. The ratio of the various constituents of the chloride mixture employed as catalyst is maintained within certain limits. Thus, the amount of copper chloride used in the catalyst composition is such that the ratio of the copper chloride to the zinc chloride is maintained between 1 to 3.5 moles of copper chloride per mole of zinc chloride employed. It is found that the chloride catalyst, utilized on a carrier particle in weight percentages of the above range and whose constituents are maintained within the above set forth ratios is an extremely active catalyst for the production of perchloroethylene and trichloroethylene in reactions involving symmetrical tetrachloroethane and oxygen at elevated temperatures.

The reaction of symmetrical tetrachloroethane and oxygen in the presence of a catalyst to produce perchloroethylene is normally conducted in tubular reactors having located therein a catalyst bed. The reactors utilized may be stainless steel, nickel, or other structural material coated or uncoated of varying length and diameter. Typically, diameters of tubular reactors employed in this process may range from ½ inch to 6 inches. Similarly, reactor lengths are considerably variable and may range for example, from 2 feet to as long as 30 feet.

The reactant gases, that is, tetrachloroethane and oxygen, are preferably passed unidirectionally through the reactors and over the catalyst beds contained therein at rates such that considerable variation may obtain in the contact time. Contact times of 30 seconds may be employed though generally feed rates are regulated so that the contact times of between 5 and 20 seconds are maintained. While preferably reactant gases are passed together into the reactors it is, of course, permissible to pass them in separately and at different points. Thus, for example, organic feed may be introduced at one end of the reactor and oxygen admitted along the line of flow of the organic feed in stages.

In addition considerable variation in temperatures utilized in accordance with the practice of this invention may be employed. Thus, temperatures ranging between 570° F. and 930° F., preferably between 680° F. and 850° F., are employed within the reactors for effective utilization of the catalyst. Hotspots are found in operations of this type in the catalyst bed and under normal conditions it is the hotspot temperature which is maintained within the temperature range above defined.

Reactors employed in accordance with this invention are jacketed and a material may be circulated through the reactor jacket at temperatures some 30° F. to 70° F. cooler than the temperature occurring in the hotspot zone of the catalyst bed. Preferably a heat transfer medium such as Dowtherm is placed in the reactor jacket where it is refluxed in a condenser and returned to the reactor jacket to accomplish the maintenance of the desired 30° F. to 70° F. temperature differential between the jacket and the hotspot temperature.

The symmetrical tetrachloroethane and oxygen fed to the reactors may be preheated by passing the gases separately through separate and distinct preheaters to bring them to a temperature close to operating reactor temperatures prior to introducing the feed gases to the reactor itself. If desired, a portion of the reactor tube itself may be utilized as a preheater by having packed therein ceramic rings or spent catalyst, that is, catalyst which is no longer capable of actively promoting the reaction of tetrachloroethane and oxygen or with any other suitable inert material which when heated will provide adequate heat exchange between the gases passing therethrough and the heated particles.

The ratio of oxygen to symmetrical tetrachloroethane fed to a system of the hereinabove described type is considerably variable but is maintained in a range so that the oxygen supplied to the reactor is between 15 percent and 75 percent of the theoretical requirement of the tetrachloroethane feed. Recycle gases, which may be product or undesirables or a combination of both, as well as unreacted tetrachloroethane, may be readily employed in the organic feed stream to the reactor, the ratio of oxygen to organic feed being maintained in the same general ranges above set forth for a pure tetrachloroethane organic feed stream. Oxygen requirements in this latter type operation are based upon the composition of the feed gas, that is, the amount of oxidizable hydrogen atoms present therein. Periodic analysis of the recycle streams will furnish information to enable one skilled in the art to determine the amount of oxygen necessary to react with all oxidizable hydrogen contained in the feed gas. On obtaining this value, the moles of oxygen per mole of organic feed is then regulated to conform to the range above defined with respect to a tetrachloroethane feed stream. Analysis and control of oxygen feed of course can be conducted continuously if desired. Oxygen in a relatively pure state is utilized although diluted oxygen such as air is operative. Somewhat lower conversions and yields have been experienced with the use of air.

Products issuing from the reactor in accordance with this invention are collected, for example, by means of Dry Ice-actone cold traps, carbon absorption techniques or any other suitable recovery system. Recycle of unconverted feed and product gases may also be effectively employed in operations of this type to achieve maximum production of desired product.

In a typical operation of the process conducted in accordance with this invention a nickel reactor tube is employed and is packed throughout a substantial portion of its length with a catalyst composition comprising copper chloride, zinc chloride impregnated on a diatomaceous earth pellet such as Celite 410. Celite 410 is a calcined diatomaceous earth (Lompac, California Diatomite) sold by the Johns-Manville Corporation under the trade name Celite.

Symmetrical tetrachloroethane feed is vaporized by passing it through an open nickel tube. Oxygen is passed through an open steel tube. If desired both the oxygen and the tetrachloroethane preheaters may be packed with inert materials such as ceramic Raschig rings, Beryl saddles and the like to improve heat transfer efficiency in these preheaters. The symmetrical tetrachloroethane and the oxygen are then premixed prior to their entry into the reactor tube. The feed rates of the oxygen and the symmetrical tetrachloroethane are adjusted so as to maintain the reactor gases within the catalytic bed for between 6 to 20 seconds. The oxygen to the tetrachloroethane feed is adjusted to provide an oxygen supply to the organic feed which is between 15 percent and 75 percent of the theoretical requirement. The gases issuing from the reactor are passed through a purification and separation system in which the perchloroethylene product and the trichloroethylene product are removed. The reactor employed is jacketed and provided with a constant circulating heat transfer medium which maintains temperatures in the reactor jacket of between 540° F. and 900° F. The catalytic bed in the reactor experiences temperatures in the range of from 570° F. to 930° F., generally between 680° F. and 850° F.

It is found in the operation of a process as hereinabove described utilizing thte oxygen deficient system that good yields of perchloroethylene and trichloroethylene are obtained, with minimum undesirable hexachloroethane and pentachloroethane formed for extended periods of time.

The following examples are descriptive of the manner in which the teachings of the present invention may be utilized.

EXAMPLE I

A cupric chloride-zinc chloride catalyst composition was prepared by dissolving 110.8 grams of cupric chloride ($CuCl_2$) and 34.1 grams of zinc chloride ($ZnCl_2$) in 350 milliliters of water. One thousand milliliters of Celite pellets (¼ inch in diameter and approximately ¼ inch in length) were placed in a rototumbler and the metal chloride containing solution was sprayed on the pellets while they were in the rototumbler. The catalyst was dried by evaporating most of the water from the mixture while mixing the pellets in the rototumbler and heating the catalyst at the same time.

EXAMPLE II

A jacketed steel reactor 3 inches in diameter and 52 inches long and heat controlled with refluxing Dowtherm in the jacket was placed in a vertical position. The reactor was packed with 1 foot of untreated Celite pellets to serve as a preheat section. Placed immediately above the inert Celite pellets was an additional foot of Celite pellets impregnated with catalyst prepared in accordance with Example I. A ¼ inch thermowell was placed concentrically in the reactor tube and used to measure bed temperatures.

The tetrachloroethane feed was metered by a positive displacement pump and the oxygen feed was metered by a rotor meter. The tetrachloroethane was vaporized in a 2 inch diameter steel pipe, 6 feet long and packed with ceramic Raschig rings. Oxygen was preheated in a 2 foot section of 1 inch diameter pipe. The organics in the product gas stream issuing from the top of the reactor are condensed. The gas issuing from the top of the condenser was further condensed by two Dry Ice-acetone cold traps in series. The gases leaving the cold traps were scrubbed with water to remove HCl and passed through a wet test meter to determine the volume of non-condensable vent gases. An Orsat analysis of the vent gases was performed to determine CO, $O_2$ and $CO_2$. The water from the vent scrubber was collected and titrated with sodium hydroxide to determine the amount of unreacted HCl. All organic products were analyzed by infrared spectrometer methods.

The following table illustrates conditions and results of this run:

*Table I*

| Jacket Temperature, °F. | Percent of Theoretical $O_2$ Fed | Moles $O_2$ Fed | Moles $C_2H_2Cl_4$ Fed | Average Catalyst Age (Hours) | Yield—Basis $C_2H_2Cl_4$ Fed—Mole Percent | | | | Percent C Burned Basis $C_2H_2Cl_4$ Fed |
|---|---|---|---|---|---|---|---|---|---|
| | | | | | $C_2Cl_4$ | $C_2HCl_3$ | $C_2HCl_5$ | $C_2Cl_6$ | |
| 690 | 39.3 | 2.768 | 13.006 | 22 | 37.03 | 30.95 | ---------- | 0.2 | 0.95 |
| 670 | 41.5 | 2.777 | 13.339 | 53 | 44.70 | 34.95 | ---------- | 0.19 | 0.73 |
| 640 | 43.8 | 3.852 | 17.565 | 72 | 40.0 | 19.3 | ---------- | 0.91 | 0.53 |
| 730 | 28.8 | 4.284 | 29.714 | 352 | 23.4 | 49.3 | 2.9 | 0.52 | 0.66 |
| 730 | 40.6 | 6.771 | 33.321 | 396 | 34.4 | 50.8 | 4.4 | 0.4 | 0.71 |
| 640 | 58.2 | 4.760 | 16.351 | 442 | 32.1 | 33.8 | 7.8 | 0.2 | 1.29 |

Thus, as can be readily seen from the examples, the utilization of the controlled oxygen input in accordance with this invention produces surprisingly low yields of hexachloroethane and pentachloroethane over prolonged periods of time.

While the invention has been described with reference to certain specific embodiments thereof, it is not intended that the invention be so limited thereby except insofar as appears in the accompanying claims.

We claim:
1. In a method of producing perchloroethylene by feeding gaseous chlorinated hydrocarbon mixture containing symmetrical tetrachloroethane and elemental oxygen to a catalytic reaction zone maintained at temperatures sufficient to produce perchloroethylene, the improvement comprising controlling the oxygen feed to provide between 15 percent and 75 percent of the stoichiometric quantity of oxygen necessary to react with the oxidizable hydrogen atoms of the chlorinated hydrocarbon feed.

2. In a method of producing perchloroethylene by feeding gaseous symmetrical tetrachloroethane and oxygen to a catalytic reaction zone maintained at a temperature sufficient to produce perchloroethylene from the feed gases, the improvement comprising controlling the oxygen feed to provide between 15 percent and 75 percent of the stoichiometric quantity of oxygen necessary to react with all the hydrogen atoms of the symmetrical tetrachloroethane.

3. A method of producing perchloroethylene comprising feeding gaseous symmetrical tetrachloroethane and oxygen into a catalyst zone maintained at a temperature sufficient to cause reaction between the oxygen and tetrachloroethane thereby producing perchloroethylene, and regulating the oxygen feed to the catalyst zone to provide between 15 percent and 75 percent of the stoichiometric quantity of oxygen necessary to oxidize the hydrogen atoms of the tetrachloroethane feed.

4. A method of producing perchloroethylene comprising passing gaseous symmetrical tetrachloroethane and oxygen through an elongated tubular reactor having a metal halide catalyst contained therein, maintaining said catalyst at temperatures sufficient to cause a reaction between the oxygen and the tetrachloroethane to produce a perchloroethylene containing product stream, regulating the oxygen feed to the catalyst to provide between 15 percent and 75 percent of the stoichiometric quantity of oxygen necessary to oxidize the hydrogen atoms of the symmetrical tetrachloroethane, separating and recovering perchloroethylene from the perchloroethylene containing product stream.

5. A method of producing perchloroethylene comprising passing gaseous partially chlorinated aliphatic hydrocarbon and oxygen through an elongated tubular reactor having a metal halide catalyst contained therein, maintaining said catalyst at temperatures sufficient to cause a reaction between the partially chlorinated hydrocarbon and the oxygen to produce a perchloroethylene containing product stream, regulating the oxygen feed to the catalyst to provide between 15 percent and 75 percent of the stoichiometric quantity of oxygen necessary to oxidize the hydrogen atoms of the partially chlorinated hydrocarbons and separating and recovering perchloroethylene from the perchloroethylene containing product stream.

6. A method of producing perchloroethylene comprising feeding gaseous symmetrical tetrachloroethane and oxygen into a catalyst zone maintained at a temperature of between 570° F. to 930° F. to cause a reaction between the oxygen and tetrachloroethane to produce perchloroethylene, and regulating the oxygen feed to the catalyst zone to provide between 15 percent and 75 percent of the stoichiometric quantity of oxygen necessary to oxidize the hydrogen atoms of the tetrachloroethane feed.

7. In a method of producing perchloroethylene comprising passing gaseous partially chlorinated aliphatic hydrocarbon and oxygen into a reaction zone having a metal halide catalyst contained therein and maintaining said catalyst at temperatures sufficient to cause a reaction between the partially chlorinated hydrocarbon and the oxygen to produce a perchloroethylene containing product stream, the improvement comprising regulating the oxygen feed to the catalyst zone to provide between 15 percent and 75 percent of the stoichiometric quantity of oxygen necessary to oxidize the hydrogen atoms of the partially chlorinated hydrocarbons and separating and recovering perchloroethylene from the perchloroethylene containing product stream.

References Cited in the file of this patent
UNITED STATES PATENTS
2,379,372    Mugdan et al. _____ June 26, 1945
FOREIGN PATENTS
550,453    Great Britain _____ Jan. 8, 1943